United States Patent Office.

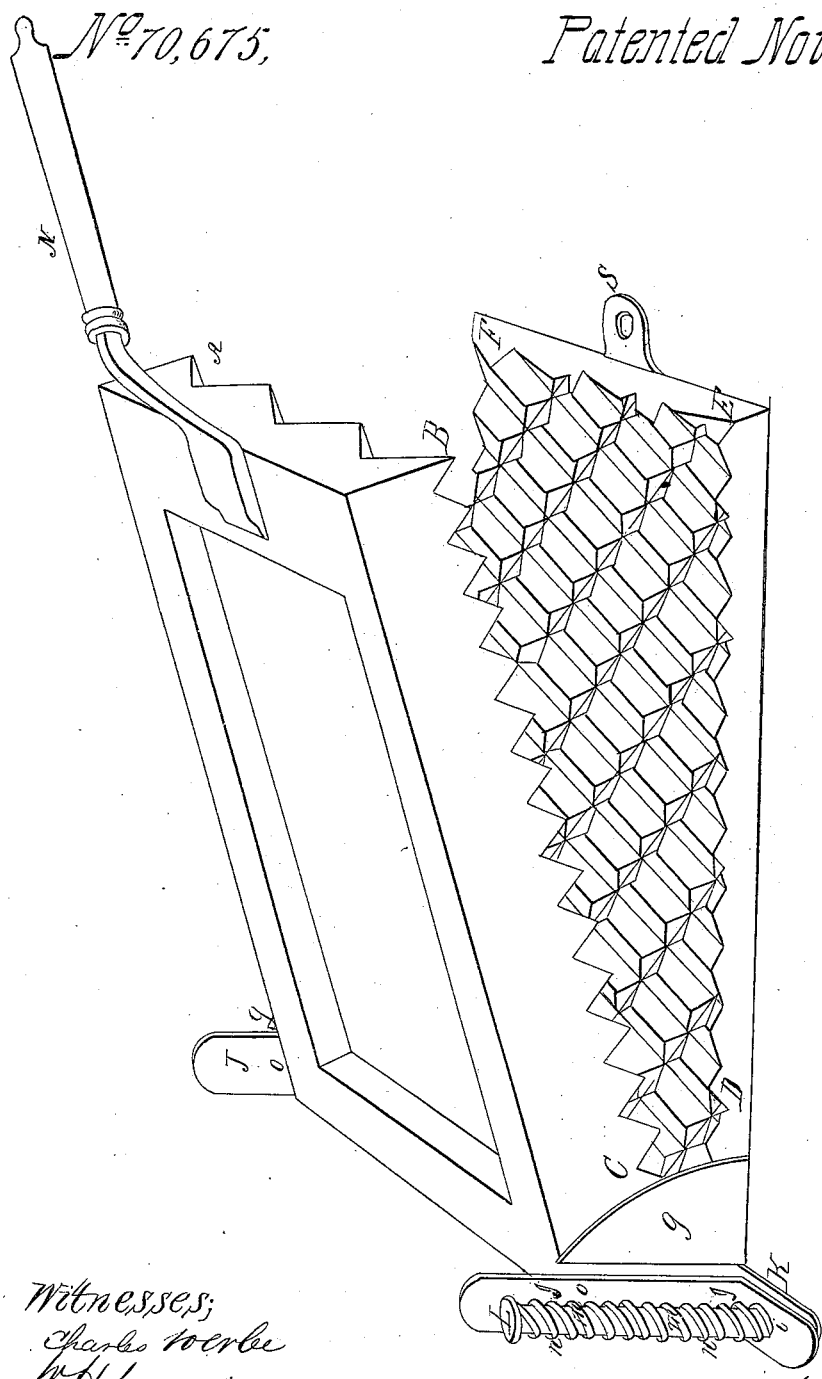

ANSON T. ADAMS, OF INDIANAPOLIS, INDIANA.

Letters Patent No. 70,675, dated November 12, 1867.

---

IMPROVED MEAT-MANGLER.

---

*The Schedule referred to in these Letters Patent and making part of the same.*

---

TO ALL WHOM IT MAY CONCERN:

Be it known that I, ANSON T. ADAMS, of the city of Indianapolis, in the county of Marion, and in the State of Indiana, have invented a Device for Mangling Meat; and I do hereby declare that the following is a full, clear, and exact description thereof, reference being had to the accompanying drawings, and to the letters of reference marked thereon.

The nature of the invention consists in the construction and use of the said device.

To enable others skilled in the art to make and use my said invention, I proceed to describe it more fully, as follows:

Said device consists of two plates or jaws, represented respectively by A B C and D E F, held together as follows: The plate I I is provided at $i$ with a round hole, and at O with a cylindrical pin, projecting into a corresponding hole in the upper jaw A B C, at O, so that the said jaw, A B C, will be free to move around it. The hole $i$ of said plate I I is then put over the upright bar $m\ m$. Over the said $m$, on the top of the horizontal part of said plate I I, is placed the spiral spring $n\ n$, and finally the nut L, screwed on the top of the said $m$, the whole, when in its proper position, being as represented by the accompanying drawings, and there designated by the appropriate letters. These two jaws, A B C and D E F, have each one serrated side, as represented in said drawings, the teeth of A B C, the upper jaw, being about twice as long as the teeth of the lower jaw D E F. The teeth of both jaws are to be otherwise of the same pitch, so that they will fall into each other when closed. The upper jaw, A B C, is provided with a convenient handle, H, and the under jaw, D E F, with suitable screw-holds, represented by S.

To use said device, the meat to be mangled is placed between the jaws. The operator then holds it with the left hand, and, grasping the handle H with the right hand, presses the upper jaw down upon the meat. When the handle is raised, the meat can be turned with the left hand, so as to present a new surface to the teeth. This process can be repeated until the meat is sufficiently mangled. The spring N N, by bending slightly, will always keep an even pressure on the whole surface of the meat.

What I claim, and desire to secure by Letters Patent, is—

The combination of the two jaws with the plates I I, bars $m\ m$, and springs $n\ n$, all arranged and operating as and for the purpose specified.

In testimony that I claim the foregoing specification, I have hereunto set my hand this 30th day of July, 1867.

ANSON T. ADAMS.

Witnesses:
CHAS. WERBE,
W. H. LOOMIS.